(12) United States Patent
Blacquiere et al.

(10) Patent No.: US 8,024,621 B2
(45) Date of Patent: *Sep. 20, 2011

(54) METHOD AND DEVICE FOR WRITING A MULTI-LAYER OPTICAL DISC

(75) Inventors: Johannis Friso Rendert Blacquiere, Eindhoven (NL); Declan Patrick Kelly, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/823,164

(22) Filed: Jun. 25, 2010

(65) Prior Publication Data

US 2010/0260027 A1      Oct. 14, 2010

Related U.S. Application Data

(63) Continuation of application No. 10/517,473, filed on Dec. 7, 2004, now Pat. No. 7,770,060.

(30) Foreign Application Priority Data

Jun. 10, 2002   (EP) .................................. 02077259

(51) Int. Cl.
*G06F 11/00* (2006.01)
(52) U.S. Cl. ......................... 714/47.1; 369/47.1
(58) Field of Classification Search .................. 714/8
See application file for complete search history.

(56) References Cited

U.S. PATENT DOCUMENTS

| | | | |
|---|---|---|---|
| 5,111,444 A | 5/1992 | Fukushima et al. | |
| 5,271,018 A * | 12/1993 | Chan | 714/710 |
| 5,303,219 A | 4/1994 | Kulakowski et al. | |
| 5,923,632 A * | 7/1999 | Kato et al. | 369/112.07 |
| 6,782,488 B1 | 8/2004 | Park et al. | |
| 6,795,381 B2 | 9/2004 | Ando et al. | |
| 6,956,809 B2 | 10/2005 | Kurokawa et al. | |
| 6,978,404 B2 * | 12/2005 | Ueda et al. | 714/710 |
| 7,187,640 B2 | 3/2007 | Heemskerk et al. | |
| 7,230,907 B2 | 6/2007 | Shoji et al. | |
| 7,577,073 B2 * | 8/2009 | Blacquiere et al. | 369/53.24 |
| 7,770,060 B2 * | 8/2010 | Blacquiere et al. | 714/8 |
| 2003/0048733 A1 | 3/2003 | Heemskerk et al. | |
| 2006/0072394 A1 * | 4/2006 | Blacquiere et al. | 369/47.1 |
| 2006/0133247 A1 * | 6/2006 | Blacquiere | 369/53.2 |
| 2007/0053251 A1 * | 3/2007 | Blacquiere et al. | 369/36.01 |
| 2007/0055979 A1 * | 3/2007 | Van Gassel et al. | 725/1 |

(Continued)

FOREIGN PATENT DOCUMENTS

EP    1258868 A2    11/2002

(Continued)

*Primary Examiner* — Scott T Baderman
*Assistant Examiner* — Kamini Patel

(57) ABSTRACT

A method is described for writing an optical disc (2) having a multi-layered storage space (30) comprising at least a first storage layer (31) and a second storage layer (32) below the first layer (31). The method comprises the step of preventing a write operation to a portion of the second storage layer (32) located below a maiden portion of said first storage layer (31).

In one embodiment, all blocks (40) which are physically located in the second storage layer (32) are incorporated in a defect list (DL) until a sufficiently large portion of the first storage layer (31) has been written at least once.

In another embodiment, all blocks (40) which are physically located in the second storage layer (32) are covered by a system file with a predetermined name ("DUMMY") until a sufficiently large portion of the first storage layer (31) has been written at least once.

15 Claims, 7 Drawing Sheets

U.S. PATENT DOCUMENTS

| | | | |
|---|---|---|---|
| 2007/0276605 A1* | 11/2007 | Blacquiere et al. | 702/19 |
| 2008/0219130 A1* | 9/2008 | Salomon et al. | 369/112.03 |
| 2008/0273434 A1* | 11/2008 | Blacquiere | 369/53.17 |
| 2008/0273437 A1* | 11/2008 | Ijtsma et al. | 369/59.25 |
| 2008/0282353 A1* | 11/2008 | Kamperman et al. | 726/26 |
| 2008/0291790 A1* | 11/2008 | Brondijk | 369/47.13 |
| 2008/0298188 A1* | 12/2008 | Hamelinck et al. | 369/47.15 |
| 2008/0310278 A1* | 12/2008 | Brondijk et al. | 369/94 |
| 2009/0109812 A1* | 4/2009 | Kuze et al. | 369/44.32 |

FOREIGN PATENT DOCUMENTS

| | | |
|---|---|---|
| EP | 1291854 A1 | 3/2003 |
| JP | 2000285469 A | 10/2000 |
| JP | 2000293947 A | 10/2000 |
| JP | 2000285469 * | 2/2001 |
| JP | 2002260235 A | 9/2002 |
| JP | 2002342925 A | 11/2002 |
| WO | 02075728 A1 | 9/2002 |

* cited by examiner

METHOD AND DEVICE FOR WRITING A MULTI-LAYER OPTICAL DISC

The present invention relates to a multi-layer optical disc having a multi-layered storage space comprising at least a first storage layer and a second storage layer below the first layer, and to methods of writing and of formatting such an optical disc. The invention also relates to a disc drive system suitable for writing such an optical disc.

Optical discs in general are known. Optical discs, in general, have a storage space which physically has the shape of a track, either in the form of a plurality of concentric circular tracks or in the form of one (or more) continuous spiral-shaped tracks. Data can be written on such a track by means of a radiation beam, such as an optical laser light beam. The optical beam changes certain properties of the disc. Writing occurs at a specific storage location which has a specific logical address and a specific physical position, which can be expressed in a suitable coordinate system, for example, polar coordinates $(R, \phi)$.

A specific class of optical discs is the class of multi-layered discs such as, for example, dual layer discs. Such discs are for instance used in DVD-systems. An essential feature of such dual layer discs is that, at a certain physical position $(R, \phi)$, data can be written at two different storage locations located at different depths. In the following, two of such different storage locations having the same polar coordinates $(R, \phi)$ but a different depth will be indicated by coordinates $(R, \phi, z)$, wherein z is either 1 or 2, indicating the first or the second layer. In the following, the storage layer closest to the light receiving surface of the optical disc will be indicated as the first layer or top layer, whereas the further layer will be indicated as the second layer or bottom layer.

It is to be noted that the two storage locations above each other, that is locations at $(R, \phi, z1)$ and $(R, \phi, z2)$, respectively, have different logical addresses.

As mentioned before, when data is written into an optical disc certain properties of the storage location change. Many discs are made from a material in which, on writing, the optical transmissivity and optical reflectivity of such storage location changes. This applies especially in the case of a disc made from a phase-change material. The phase-change material of a blank disc may, for example, be in an amorphous phase and changes into a crystalline phase under the influence of a writing laser beam.

For such discs this means that, if a disc has a first portion which has been written and a second portion which is still blank, the relevant optical properties of these two portions are very different. In a single layer optical disc this does not pose any problem. However, in the case of a dual layer disc this could lead to a problem when a write or read operation is performed to or from the second layer when the first layer is partly blank and has partly been written. This can be understood as follows. When writing or reading the second layer the optical beam must inevitably pass the first layer. If the first layer is optically not homogeneous, for instance because of being partly blank and partly written, the optical properties of the focal spot (for example, size and/or intensity) at the depth of the second layer will vary due to the varying transmissivity and reflectivity of the first layer. This is an undesirable effect.

The problems as mentioned above occur especially when the first layer is partly blank. If the first layer has been written at least once, a further write operation will not effect such a drastic change of transmissivity and reflectivity and a write process or a read process to or from the second layer will hardly be affected by the number of times that the first layer has been written as long as the first layer has been written at least once.

Therefore, one solution to overcome the above-mentioned problem might be to perform a write operation on the entire first layer, writing for instance dummy information into the first layer, when a blank disc is used for the first time. However, such an operation will take a very long time during which the user cannot use the disc.

A main objective of the present invention is to provide a method for writing a multi-layer optical disc and to provide a writing apparatus for writing multi-layer optical discs in which the above problems are avoided while a blank disc is nevertheless immediately available for use.

According to a key feature of the present invention, writing into the second layer is prevented until the first layer has been written. Within the scope of the present invention it is possible to first write the entire first layer and only then allow writing of the second layer. However, it is also possible to allow writing in a portion of the second layer as soon as a corresponding portion of the first layer has been written.

As mentioned above, each individual storage location has a unique logical address, all logical addresses together defining a logical space. When a disc is blank, all logical addresses are basically available for writing. In practice, writing to an optical disc is usually performed on request of a user application or a computer program which sends a piece of data (such as, for example, a file) to a disc drive, ordering the disc drive to record the data onto the optical disc. It may be that such an application or computer program is designed to select a specific logical address for writing, from the logical address space available. In selecting a logical address, the user application or computer program may select a logical address corresponding to a storage location located in the second layer while the corresponding first layer has not yet been written. On the other hand, the user application or computer program generally has no information on status details of the optical disc, such as the fact whether or not the optical disc is a dual layer disc and the fact whether or not the first layer of such a dual layer disc is still blank. Therefore, a user application or computer program sending data to a disc drive and requesting writing at a specific location generally has not been designed with a view to the above-mentioned problems.

It is a further object of the present invention to provide a solution to the above-mentioned problems which is compatible with existing user applications or computer programs, without needing any amendments to such existing user applications or computer programs.

According to a first aspect of the present invention this object is achieved if the second layer is defined as being defective until at least a portion of the first layer has been written.

According to a second aspect of the present invention a table of blank addresses and written addresses (write history table) is kept, and this information is used, either directly or indirectly, when allocating a logical address in response to a write command. Now, it is possible that the second layer is defined as a used file until at least a portion of the first layer has been written.

These and other aspects, features and advantages of the present invention will be further explained by the following description of preferred embodiments of the method according to the present invention with reference to the drawings, in which corresponding reference numerals indicate corresponding or similar parts, and in which:

FIG. 3A and FIG. 3B are diagrams illustrating a storage space of a dual optical disc.

Figure 1:
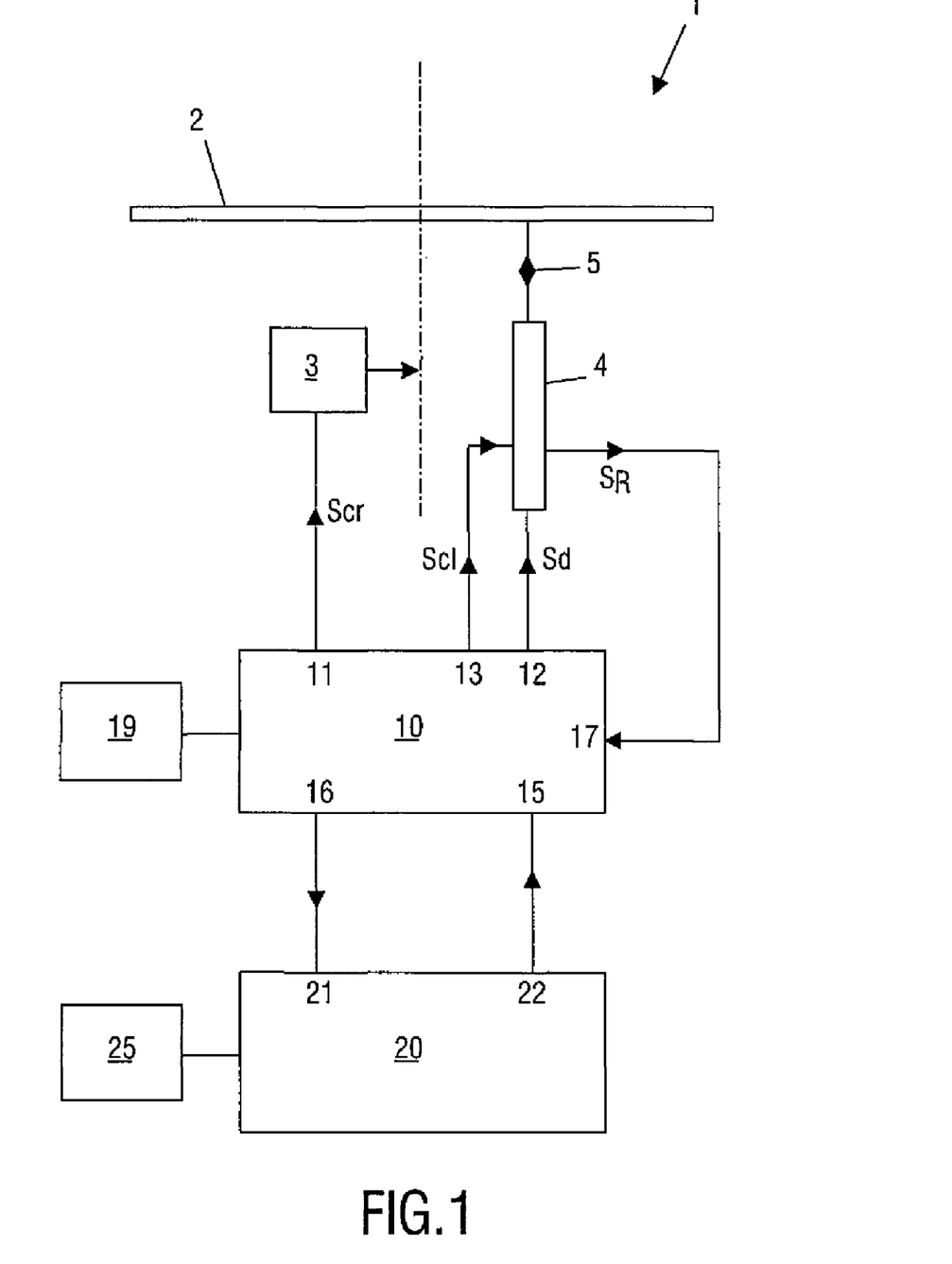
FIG. 1 is a functional block diagram illustrating a disc drive.

FIG. 1 schematically shows relevant components of an optical disc drive, generally indicated by reference numeral 1. The optical disc drive 1 comprises receiving means (not shown for sake of convenience) for receiving an optical disc 2, and rotating means 3 for rotating the optical disc 2 at a predetermined rotational speed. The rotating means 3 may be adapted for constant angular velocity drive, or for constant linear velocity drive, or a combination of such modes. Since such receiving means and rotating means are well known in prior art, it is not necessary here to explain their design and functioning in detail.

As is commonly known, an optical disc 2 comprises tracks for writing data, and written data can be read from the tracks. The tracks may be implemented as a plurality of separate, concentric circular tracks, but also as consecutive turns of a unique, continuous spiral-shaped track. In the context of the present invention, the type of track is not important. For easy reference, the term "track" will hereinafter be used to indicate a 360° track portion.

For reading (and possibly writing) data by optical means, the disc player 1 also comprises light beam generating means 4, arranged to scan the surface of the rotating disc 2 with an optical beam 5 and to derive a read signal $S_R$ from the reflected beam. Typically, the light beam is a laser beam generated by a laser diode. The light beam generating means 4 comprise an optical head with an optical lens system, typically comprising a collimator lens and an objective lens, not shown for sake of convenience. Since in general such light beam generating means are well known from prior art, it is not necessary here to explain their design and functioning in detail.

The disc drive 1 also comprises a disc drive system 10, designed to control the rotating means 3 and the light beam generating means 4 for performing a write operation at a certain location. In FIG. 1, the disc drive system 10 is illustrated as having an input 17 for receiving the read signal $S_R$. Furthermore, the disc drive system 10 is illustrated as having a first output 11 providing a first control signal Scr controlling the operation of the rotating means 3. Furthermore, the disc drive system 10 is illustrated as having a second output 12 providing a data signal Sd to the light beam generating means 4. The disc drive system 10 shown also has a third output 13 for providing a second control signal Scl for the laser beam generating means 4. As will be clear to a person skilled in the art, this control signal Scl actually involves a control signal for a radial servo actuator controlling the radial location of the laser spot, and a control signal for a focal servo actuator controlling the depth of the focal spot. The data signal Sd represents the information to be written into the optical disc 2. All in all, the disc drive system 10 determines which data to write, and at what physical location to write the data. More specifically, if it is desired that a certain data X is written at a certain logical address L, corresponding to a physical location (R, φ, z), then the disc drive system 10 controls the rotating means 3 and the laser beam generating means 4 in such a way that the desired data is written at the desired location. Since such disc drive system 10 is known per se, it is not necessary here to explain its design and functioning in more detail.

In use, the disc drive 1 communicates with a file system 20 of a user application on a user computer. The file system is designed for handling the writing of user files to a disc and the reading of user files from a disc. For receiving information from the disc drive, the file system 20 is illustrated as having an input 21 coupled to an output 16 of the disc drive system 10. For instructing the disc drive to write/read information to/from an optical disc, the file system 20 is illustrated as having an output 22 coupled to an input 15 of the disc drive system 10.

Figure 2A:
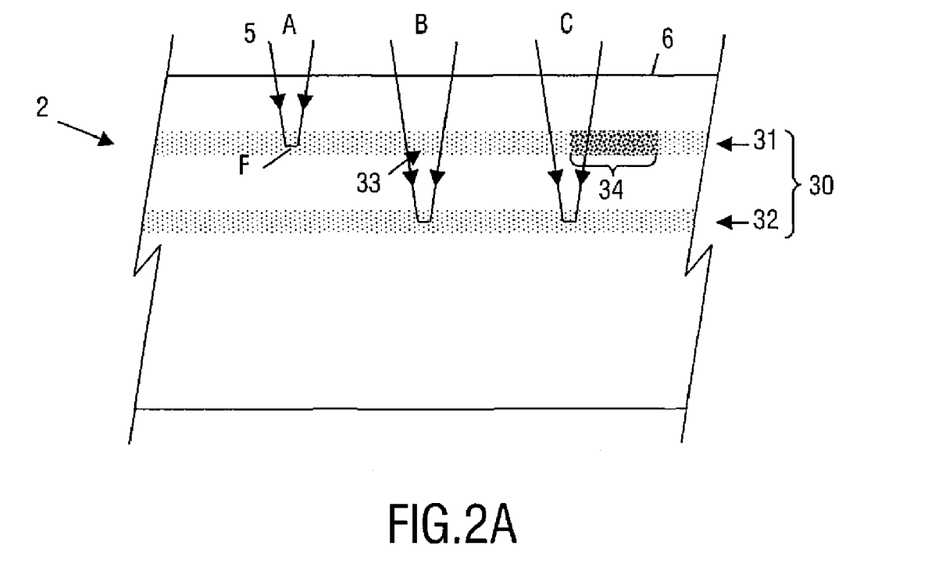
FIG. 2A and FIG. 2B are schematical cross-sections of a part of an optical disc.

Next, in respect of a two-layer disc made from a material in which, on writing, the optical transmissivity and optical reflectivity change, a problem will be explained with reference to FIGS. 2A-B. FIG. 2A is a cross-section of view of a part of an optical disc 2, which comprises a two-layered storage space 30, comprising a first layer 31 and a second layer 32, the first layer 31 being closer to a light-receiving main surface 6 of the optical disc 2. For writing data into the first storage layer 31, an optical write beam 5 is focused such that the focal spot F coincides with the first layer 31 as illustrated at A. The disc 2 is rotated and the focal spot F of the write beam 5 follows a track (not shown) in the first layer 31, modulated by the data signal Sd from the disc drive system 10, causing changes in the optical properties of the first layer 31.

Similarly, when writing data into the second storage layer 32, the write beam 5 is focused such that its focal spot F coincides with the second layer 32 as illustrated at B in FIG. 2.

When reading data from the first storage layer 31 or the second storage layer 32, a read beam 5 is similarly focused to the first storage layer 31 or the second storage layer 32, respectively. Basically, a read beam differs from a write beam in that a read beam has less optical power and will not cause a large change of optical properties of the storage layers 31 or 32.

In FIG. 2A it can clearly be seen that, in order to write information into the second storage layer 32, the write beam 5 has to pass through the first storage layer 31, as indicated at 33. If the first layer 31 has homogeneous optical properties, writing into the second layer 32 will not be disturbed by the first layer 31.

Reference numeral 34 indicates a portion of the first layer 31 which has already been written and which has, therefore, optical properties differing from the remaining part of the first storage layer 31. At C is shown a write beam 5, a part of which passes through this written portion 34 of the first storage layer 31. Assuming that the beam 5 moves from the left to the right with respect to the optical disc 2, it should be recognized that the writing process into the second layer 32 is disturbed by the transition from the non-written portion of the first layer 31 to the written portion 34 of the first layer 31. According to the present invention, this problem is avoided by assuring that the first layer 31 is written before the second layer 32.

Referring to FIG. 2A, the first layer 31 is thus written first as indicated at A. The situations indicated at B and C are prevented by the present invention.

Figure 2B:
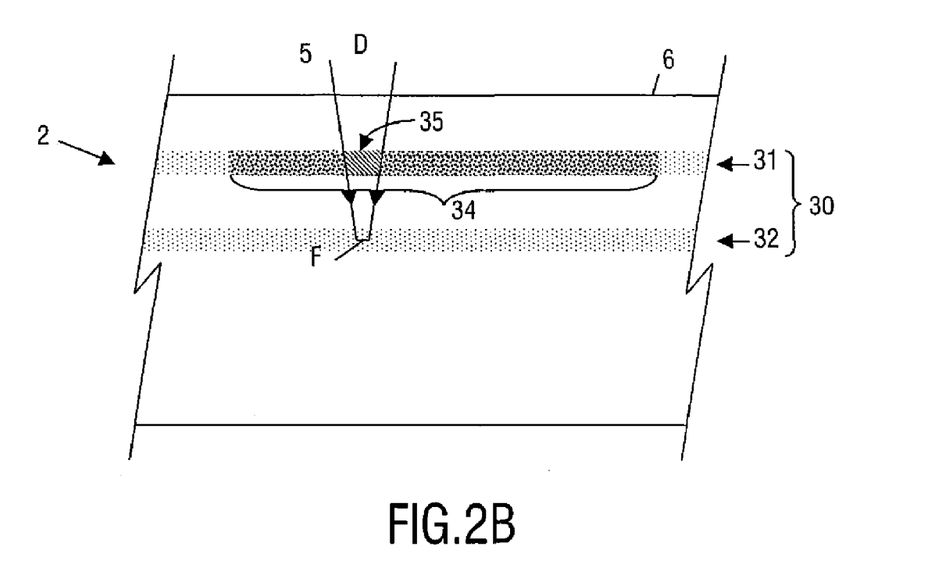

FIG. 2B is a cross-sectional view similar to FIG. 2A, showing a relatively large portion 34 of the first layer 31 having been written. At D, a write beam 5 is shown, which writes a portion of the second storage layer 32 corresponding to said written portion 34 of the first layer 31. Assuming that the write beam 5 moves from the left to the right in FIG. 2B, it can be recognized that the write beam 5 has to pass the written portion 34 of the first layer 31, as indicated at 35; however, in the case of movement, from the left to the right, the written portion 34 is substantially homogeneous to the write beam 5 such that the write process for the underlying layer 32 is not disturbed.

FIG. 3A is a diagram illustrating the storage space 30 of the dual optical disc 2 as a continuous ribbon, divided into storage blocks 40. Each storage block can contain a predetermined number of data bits as will be known to a person skilled in the art. Each storage block 40 has a unique physical disc address, which substantially corresponds to the physical position of such block on the disc. In FIG. 3A, the physical disc addresses P of the blocks 40 are indicated as consecutive numbers, each block 40 having a physical disc address corresponding to the physical disc address of its predecessor plus one. As illustrated in FIG. 3A, the logical blocks 40 usually also have a logical disc address L, allocated by the drive system 10. An important difference between physical disc addresses and logical disc addresses becomes clear when considering defective blocks 41 which are not usable for storing data. In FIG. 3A, the blocks having the physical disc addresses N+3, N+4 and N+5 are defective. In other words, when going from left to right in FIG. 3A, the last usable block before the defective portion 41 has the physical disc address N+2, and the first usable block after the defective portion 41 has the physical disc address N+6. When allocating logical disc addresses to the blocks 40 during a formatting operation, it may be that the drive system 10 skips the defective blocks 41, as illustrated in FIG. 3A, so that the last usable block before the defective portion 41 has the logical disc address N+2, whereas the first usable block after the defective portion 41 has the logical disc address N+3.

Furthermore, an important difference is that not all usable blocks are given a logical disc address. The disc drive system 10 may reserve some blocks for its own use only. As an example, in DVD, the drive system 10 reserves the first 30000 blocks for lead in, so that the logical disc address L=1 corresponds to the physical disc address P=30001. The disc drive system 10 may also reserve some blocks as spare area for replacing blocks which become defective during use.

Figure 3B:
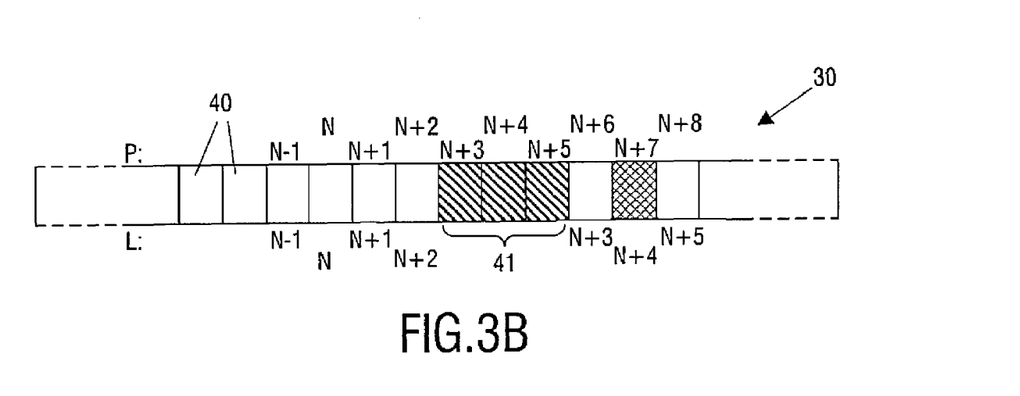

FIG. 3B, similar to FIG. 3A, also shows the storage space 30 as a ribbon, but now on a different scale. Whereas FIG. 3A illustrates individual blocks of a very small portion of the storage space 30, FIG. 3B shows the entire storage space 30.

In the example illustrated in FIG. 3B, two portions 30RD1 and 30RD2, also indicated as lead-in area and lead-out area, respectively, are reserved for use by the disc drive system 10 itself, i.e. these portions of the storage space 30 are not made available to a user. The drive system 10 has allocated logical disc addresses to the remaining part of the storage space 30, with the exception of a defective area 41 and a spare area 42. The drive system 10 uses the logical disc addresses to make this part of the storage space 30, indicated hereinafter as file system storage space 30F, available to the file system 20.

The mapping of physical disc addresses to logical disc addresses is usually done in accordance with a predefined standard, for instance the Mount Rainier standard.

Information on the relation between physical disc addresses and logical disc addresses is stored in a first portion 51 of the reserved storage space 30RD1. This information will be indicated as disc address information DAI.

The file system 20 is associated with a memory 25 containing, inter alia, a list of files stored on the disc and the corresponding logical disc addresses.

The file system 20 performs a remapping of the logical disc addresses as defined by the disc drive so as to define a logical space to a user, indicated as user storage space 30U, available for storing user data. Herein, the file system 20 reserves part of the file system storage space 30F for its own use, indicated as reserved file storage portion 30RF; the remaining part of the file system storage space 30F is made available for a user as user storage space 30U; logical addresses in this user storage space 30U are indicated as logical user addresses.

When an optical disc is placed into an optical disc drive, the disc address information DAI in the first portion 51 of the reserved storage space 30RD1 is copied into a memory 19 associated with the drive system 10, so that the drive system 10 knows which physical disc addresses P correspond to logical disc addresses L.

When storing information into the disc, the logical user addresses of the file to be stored are translated into logical disc addresses by the file system 20, which are translated into physical disc addresses P by the disc system 10, taking into account the disc address information DAI in said first portion 51 of the reserved storage space 30RD1, so that the defective portion 41 is skipped automatically.

In practice, it may happen that a certain block becomes defective after some time. In FIG. 3A, the cross-hatching in the block with the physical address P=N+7, corresponding to the logical address L=N+4, indicates a defective block. If the file system 20 were to attempt a write to such a defective block, this would result in an error message being sent by the drive system 10 to the file system 20.

FIG. 3B indicates a second portion 52 of the reserved storage space 30RD1 which contains a defect list DL, i.e. a list of all blocks (physical disc address) that have become defective. When the disc 2 is introduced into a disc drive 1, the defect list DL of the second portion 52 of the reserved storage space 30RD1 is also copied into memory 19 of the drive system 10. When, in operation, during a write operation or a read operation the drive system 10 encounters a defective block not mentioned in the defect list DL, it will update the defect list DL by incorporating the corresponding physical address and write the updated defect list DL to the disc, either immediately or just before the disc is eventually taken out of the disc drive.

FIG. 3B shows the user storage space 30U sub-divided into two portions 30UO and 30UF, respectively. The reference 30UO indicates part of the user storage space 30U which is already occupied by user data. The reference 30UF indicates part of the user storage space 30U which is still free for storing user data. For the sake of simplicity, the occupied user storage space 30UO is illustrated as one continuous part of the user storage space 30U, and also the free user storage space 30UF is shown as one continuous part of the user storage space 30U. In practice, however, the user storage space 30U may be fragmented, i.e. containing multiple occupied portions alternating with free portions.

A portion 53 of the reserved file system storage space 30RF contains a file allocation list FAL, i.e. a list of the files stored by the user, and corresponding logical disc addresses. When the optical disc 2 is introduced into an optical disc drive 1, the file system 20 instructs the drive system 10 to read the file allocation list FAL from the portion 53 of the reserved file system storage space 30RF and to communicate this list to the file system 20 which stores a copy of the file allocation list FAL into its memory 25.

When the file system 20 receives instructions to store a certain file, the file system 20 will only consider logical addresses L in the free user space 30UF on the basis of the information in the file allocation list FAL. When writing data to the disc, the file system 20 will also update the file allocation list FAL, so that the blocks 40 where the data have been written will now be incorporated in the file allocation list FAL and will hence be considered as occupied user storage space 30UO. On the other hand, if the file system 20 receives instructions to delete a file, the corresponding information is removed from the file allocation list FAL, such that the corresponding blocks are now part of the free user storage space 30UF.

The file system 20 will communicate the updated file allocation list FAL to the drive system 10, and will instruct the drive system 10 to write the updated file allocation list FAL to the disc, either immediately or just before the disc is eventually taken out of the disc drive.

In FIG. 3B, the user space 30U is shown sub-divided into two sections 30U1 and 30U2, corresponding to the first storage layer 31 and the second storage layer 32, respectively. More precisely, the first user storage section 30U1 comprises the logical addresses corresponding to the storage blocks 40 which are physically located in the first storage layer 31, whereas the second user segment 30U2 comprises logical addresses corresponding to the logical blocks 40 which are physically located in the second storage layer 32. Here, the two user segments 30U1 and 30U2 are each shown as being continuous; this corresponds to a situation where subsequent logical disc addresses have first been allocated to the first logical layer 31 whereas all subsequent logical disc addresses have been allocated to the second storage layer 32. However, this need not be the case in practice. It may be that lower logical disc addresses are allocated to the second storage layer 32 whereas higher logical disc addresses are allocated to the first storage layer 31. It is also possible that logical disc addresses are first allocated to a track in the first storage layer 31, then to a track in the second storage layer 32, then to the next track in the first storage layer 31, etc. It is also possible that tracks are grouped in zones, and that logical disc addresses are first allocated to a zone in the first storage layer 31, then to a zone in the second storage layer 32, then to the next zone in the first storage layer 31, etc. In those cases, the representation of FIG. 3B would be more fragmented.

When a conventional dual layer optical disc is placed in a conventional disc drive and the file system receives a command to write a file, the file system is free to select any portion of the free user storage space 30UF, including a portion corresponding to the second segment 30U2 of the free user storage space 30UF, i.e. the second storage layer 32, even if the first storage layer 31 above has not been written yet. According to the proposals of the present invention this situation can be prevented as described hereinafter.

Figure 4A:
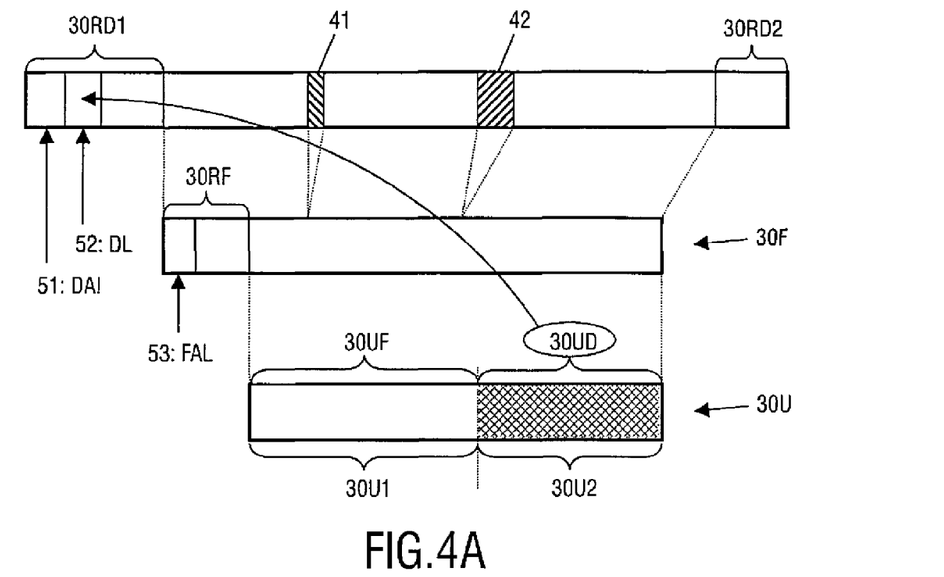
FIG. 4A and FIG. 4B are diagrams illustrating a storage space of a dual optical disc.
Figure 4B:
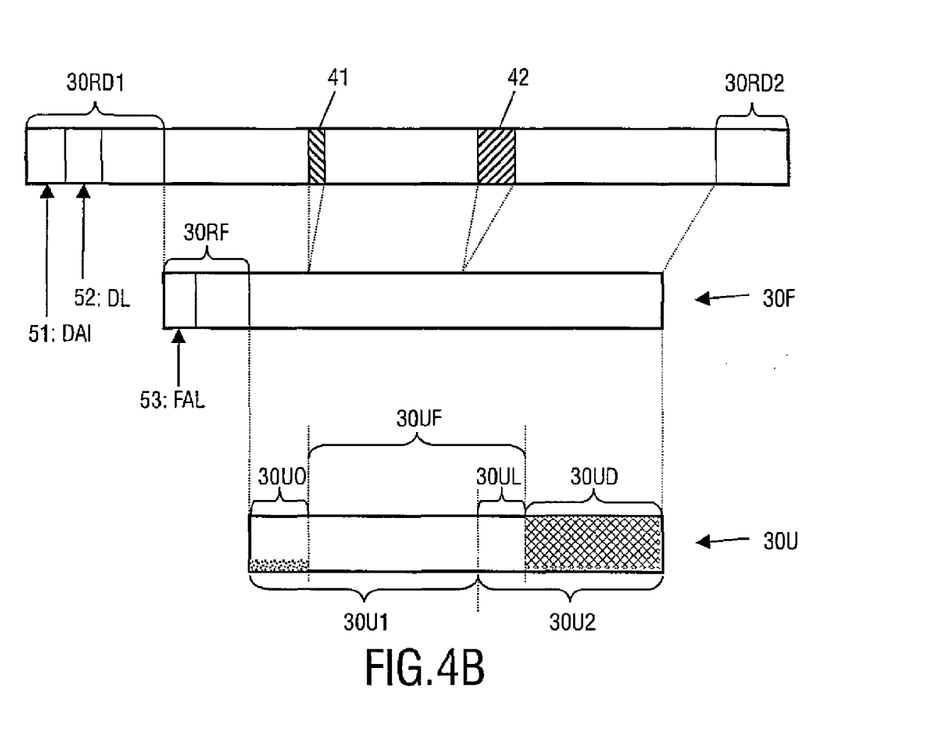

A first embodiment of the present invention will now be discussed with reference to the FIGS. 4A and 4B. Consider a "maiden disc" 2 being introduced into a disc drive 1. The phrase "maiden disc" refers to a disc immediately after manufacturing. Such a disc does not yet contain the structure illustrated in the FIGS. 3A and 3B; more particularly, a maiden disc does not yet contain disc address information DAT, nor a defect list DL, nor a file allocation list FAL. When a disc is entered into a drive which is capable of handling multiple types of discs, the drive system 10 first executes a disc recognition process in order to determine the type of disc. Thus, the disc drive system 10 will recognize that the disc is a dual layer disc. Furthermore, the disc drive system 10 will define the blocks 40 in the physical storage space, define logical disc addresses L, define disc address information DAI, define a defect list DL, and define a file allocation list FAL. The conversion from physical disc addresses to logical disc addresses is mostly determined by the disc standard, corresponding to the disc type. After having performed the formatting operation, the disc drive system 10 will know which logical addresses correspond to the second storage layer 32, indicated as the second user storage space 30U2. According to an important aspect of this first embodiment of the present invention, the disc drive system 10 is designed to mark the entire second user storage space 30U2 as being defective, indicated as the cross-hatched area 30UD in FIG. 4A. In other words, all addresses corresponding to the second user storage space 30U2 are listed in the defect list file DL stored in the portion 52 on disc.

The fact that the disc drive system 10 has marked the entire second user storage space 30U2 as being defective, i.e. that all physical addresses corresponding to the second user storage space 30U2 are listed in the defect list file DL stored in the portion 52 on the disc, will force any file system to only write information in the first user storage space 30U1, i.e. in the first storage layer 31. This applies even to conventional file systems not designed in accordance with the present invention. Such a conventional file system may attempt a write in the second storage layer 32, but this will result in an error message generated by the drive system 10.

According to a preferred aspect of the present invention, the defect list DL is also communicated to the file system 20, which stores a copy of the defect list DL in its memory 25. Furthermore, according to this preferred aspect of the present invention, the file system 20 is adapted to take the defect list DL into account when choosing logical disc addresses in response to a command to store a file, so that defective blocks are skipped while error messages are avoided. In other words, in the case of a file system designed in accordance with the present invention as explained above, such a file system will not even attempt a write in the second storage layer 32.

In this respect, it is to be noted that the defect list DL contains physical disc addresses, whereas the file system storage space 30F, available to the file system 20, is defined by logical disc addresses allocated by the disc drive system 10. Therefore, the file system 20 is only capable of taking the defect list DL into account if the file system 20 also incorporates knowledge regarding the correspondence between physical disc addresses and logical disc addresses. This can be implemented in several ways. First, it is possible to also communicate to the file system 20 the disc address information DAI in said first portion 51 of the reserved storage space 30RD1. Alternatively, it is also possible that the disc has been formatted according to a certain standard, such as for instance the Mount Rainier standard, which includes the length of the lead-in area 30RD1 and the locations of spare area; in that case, it suffices to communicate this information to the file system 20, so that the file system 20 can calculate an approximate correspondence between logical addresses and physical addresses.

It should be recognized that, once a dual layer disc has been formatted by a disc drive embodying the present invention, also conventional disc drives, i.e. disc drives which are not embodying the present invention, are prohibited from writing information in the second storage layer 32, because conventional disc drives take the defect list DL into account. Thus, by incorporating all physical addresses of the second storage layer 32 in the defect list DL, the second storage layer 32 is virtually made inaccessible, even to conventional disc drives and conventional user programs not embodying the present invention.

The second user storage space 30U2, indicated as being defective by being included entirely in the defect list 52, actually is not defective at all of course, and constitutes potentially usable storage space. Logical addresses within this potentially usable storage space can be made actually usable by removing these logical addresses from the defect list DL. In fact, if no further action were taken, the second storage layer could never be used and the effective storage capacity of the disc would be reduced by half. Therefore, according to a preferred important aspect of the present invention, logical addresses in the second user storage space 30U2 are removed from the defect list DL at a suitable time.

In a specific embodiment, a drive system according to the present invention may be programmed to, in a first stage, only write data to the first storage layer 31, without updating the defect list. It is only when the first storage layer 31 is completely full, that the drive system removes from the defect list all logical addresses of the second storage layer 32, thus making the entire second storage layer 32 available in one go. However, a disadvantage of this method is that the user does not have a realistic view of the available storage space of his disc. As is commonly known, computers have a feature which allows to scan a memory device for the amount of available memory. In the present case, if the disc drive would receive a command to scan the disc for available memory during said first stage, the disc drive would only recognize the first user storage space 30U1 as available memory and, as the occupied user storage space 30UO increases and approaches the limits of the first user storage space 30U1, the disc drive will tell the user that the amount of free user storage space 30UF approaches zero, while in fact the disc is still half empty.

Therefore, in a preferred embodiment, a disc drive system according to the present invention is programmed to update the defect list 52 after each write operation to the first user storage area 30U1, thus releasing part of the second user storage area 30U2 for writing. Such an embodiment is shown in FIG. 4B. FIG. 4B illustrates the situation of a disc having a first user storage area 30U1 which has partly been written as indicated by the occupied user storage area 30UO. After the write operation, the disc drive system has liberated a portion 30UL of the second user storage area 30U2 by removing from the defect list the physical addresses corresponding to this liberated portion 30UL. The remaining portion of the second user storage area 30U2 is still indicated as being a defective area 30UD. The free user storage area 30UF now includes the liberated portion 30UL of the second user storage area 30U2.

It should be appreciated that now a user will be given a more realistic view of the amount of free storage space available.

Figure 4C:
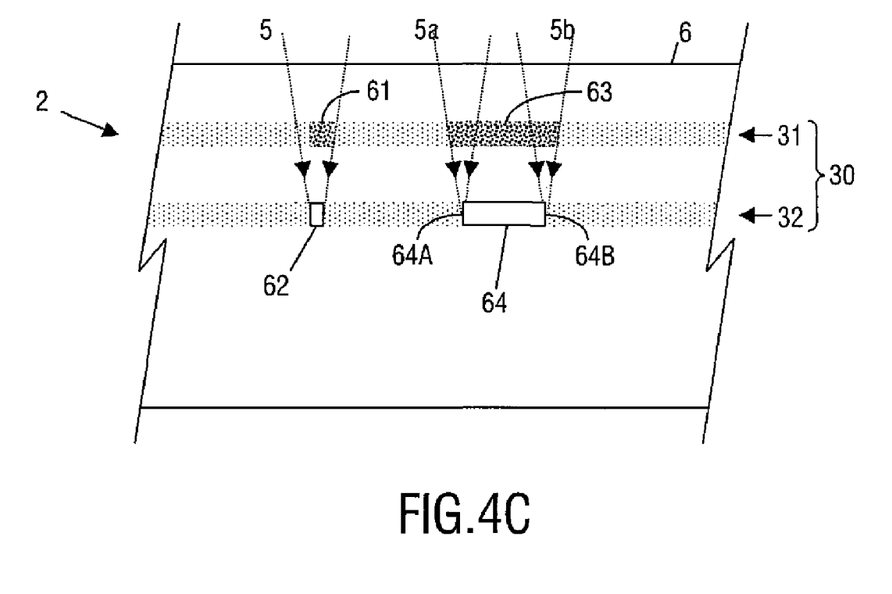
FIG. 4C is a schematical cross-section of a part of an optical disc.

After each write operation, the disc drive system 10 according to the present invention calculates which logical addresses can be liberated as described above. In such calculation, the disc drive system 10 takes into account various properties of the disc 2 and of the disc drive 1, as illustrated in FIG. 4C. FIG. 4C is a cross-sectional view of a disc 1 with the top surface 6, the first storage layer 31 and the second storage layer 32. The shape of a laser beam focused to the second storage layer 32 is indicated by a dotted line. A first written portion of the first storage layer 31 is indicated at 61. A corresponding portion of the second storage layer 32, physically located below the portion 61, is indicated at 62. If light rays were to impinge exactly perpendicularly to the top surface 6, the second portion 62 would be entirely in the shade of the first portion 61, so it might be liberated. However, due to the top angle of the focused light beam 5, the first portion 61 is not large enough to allow liberation of the second portion 62.

FIG. 4C also shows another written portion 63 of the first layer 31, larger than the first written portion 61. The laser beam 5 is shown in two extreme positions 5a and 5b. The left-hand extreme position of the laser beam 5a corresponds to the left-most position of the laser beam where the entire laser beam passes the portion 63. Similarly, the right-most position 5B of the laser beam is the right-most position where the entire laser beam passes the portion 63. Upon movement of the laser beam from the left-most position 5a to the right-most position 5b, the laser beam always passes the portion 63 entirely and is not disturbed by variations in the first layer, because this portion 63 is free from such variations. Thus, the left-most laser beam 5a defines a left extremity 64a of a portion 64 of the second storage layer 32, while the right-most laser beam 5b defines a right extremity 64b of such a portion 64, which may be considered as being entirely in the shade of the portion 63.

Thus, if the portion 63 of the first storage layer 31 is large enough, a portion 64 of the second storage layer 32 can be liberated. It is to be noted that the above considerations apply to the radial dimension of the portions 63, 64 as well as to the circumferential dimension of the portions 63, 64.

According to a further preferred embodiment, the disc drive system 10 defines a table DT identifying a defect type in respect of each physical address mentioned in the defect list DL. This defect type list DT is also stored on the disc, that is, in a portion of the lead-in area 30RD1, although in principle it will also be possible to store this defect type list DT as a hidden file in user area, assuming that the disc system 20 has the proper file system knowledge. The information stored in this defect type list DT indicates, inter alia, whether a block is truly defective or virtually defective. Thus, when the disc drive system 10 specifies all addresses of the second storage layer 32 as being defective, it writes in the defect type list DT a code indicating that these addresses are only virtually defective.

This information can be used in several ways. When a disc drive is asked to scan the disc for the available amount of storage space, a disc drive system 10 programmed in accordance with the invention can take this information in the defect type list DT into account by considering the virtually defective blocks as potential storage space, so as to give the user a more realistic view of the storage capacity of the disc. This information also allows the disc drive system 10 to distinguish between blocks which have been made temporarily inaccessible in accordance with the invention on the one hand, and blocks which have truly proved defective on the other hand. Then, after a write session in respect of the first storage layer 31, when making the calculations for liberating a portion 30UL of the second storage layer 32 as described with reference to FIG. 4B, the disc drive system 10 will only liberate blocks which are labeled "virtually defective" and will maintain in the defect list blocks which are labeled "truly defective".

Figure 6:
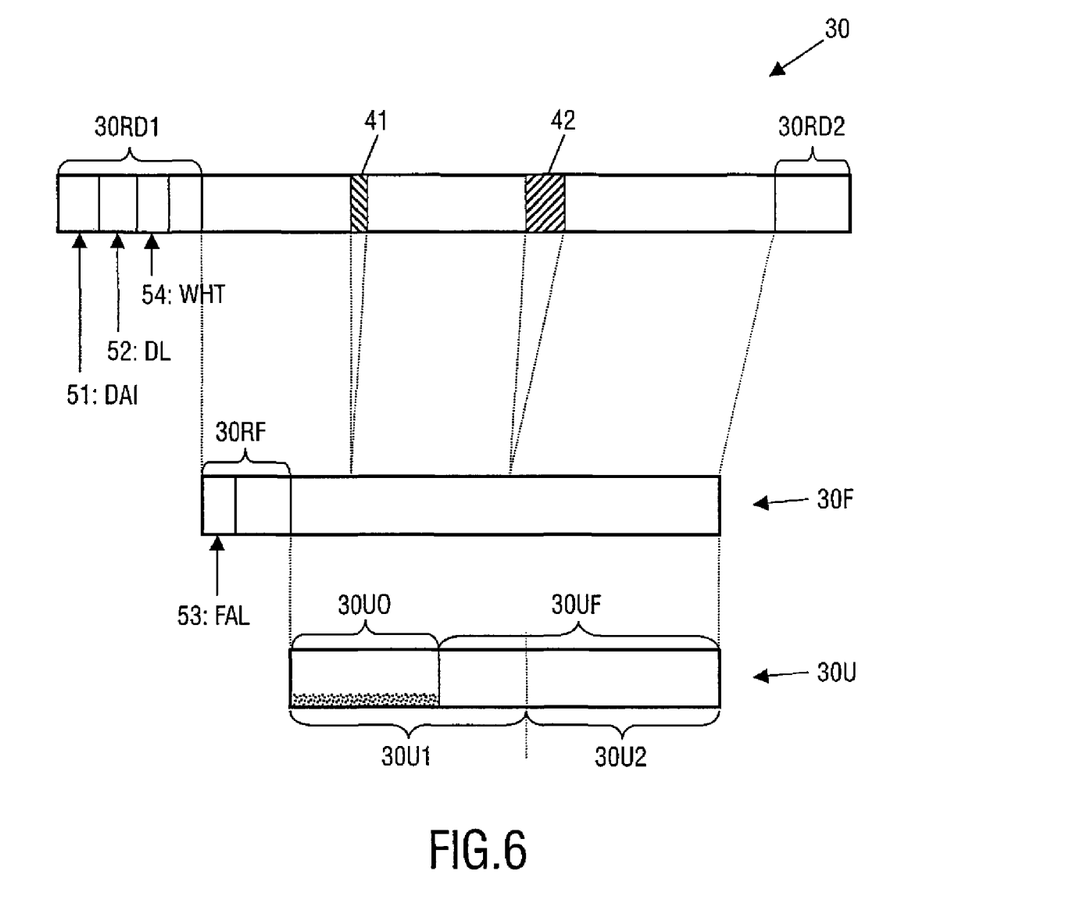
FIG. 6 is a diagram illustrating a storage space of a dual optical disc.

A second embodiment of the present invention will now be discussed with reference to FIG. 6. In this second embodiment, the optical disc 2 contains a write history table WHT, preferably stored as a system file in a portion 54 of the lead-in area 30RD1 as shown, which table contains information with respect to all physical disc addresses, indicating whether or not a physical address has already been written to. For instance, for each physical address, the write history table may comprise a bit which has a first value, for instance "0", when the corresponding physical address is still maiden, and which has a second value, for instance "1", when the corresponding physical address has at least been written to once.

According to this embodiment, when a disc is placed in a disc drive, the drive system 10 reads the write history table WHT from disc and stores the write history table WHT into its memory 19. Furthermore, the drive system 10 communicates the write history table WHT to the file system 20, which stores the write history table WHT in its memory 25. A file system 20 according to this embodiment is adapted to, before any write operation, check the information in this write history table to determine which portions of the second user storage area 30U2 correspond to portions of the first user storage area 30U1 which have been written such that the portion of the second user storage area 30U2 is free to be written to.

In the case of DVD+RW, such a table is standard, and the file system 20 can use the information in this standard write history file.

After a write operation, the write history table WHT is updated by the disc drive system 10 by writing the second value "1" into the bits corresponding to the logical addresses L which have been written during such a write operation.

The second embodiment as explained above involves both a disc drive system 10 and a file system 20 designed in accordance with the present invention. However, this solution is not respected automatically by a conventional disc drive, even in conjunction with a file system 20 designed in accordance with the present invention, because a conventional disc drive system 10 is not programmed to read the write history table, nor to update the write history table. On the other hand, this solution is not respected automatically by a conventional file system, even in conjunction with a disc drive designed in accordance with the present invention, because a conventional file system is not programmed to select storage locations on the basis of a write history table WHT. Therefore, in a preferred embodiment, the file system 20 is designed to define the second storage layer as used area.

Figure 5A:
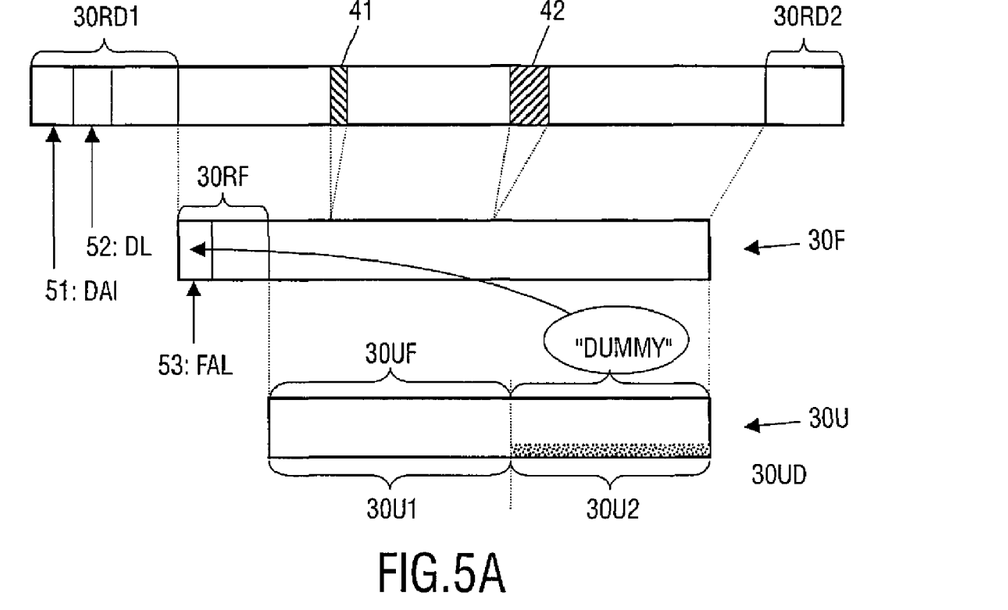
FIG. 5A and FIG. 5B are diagrams illustrating a storage space of a dual optical disc.
Figure 5B:
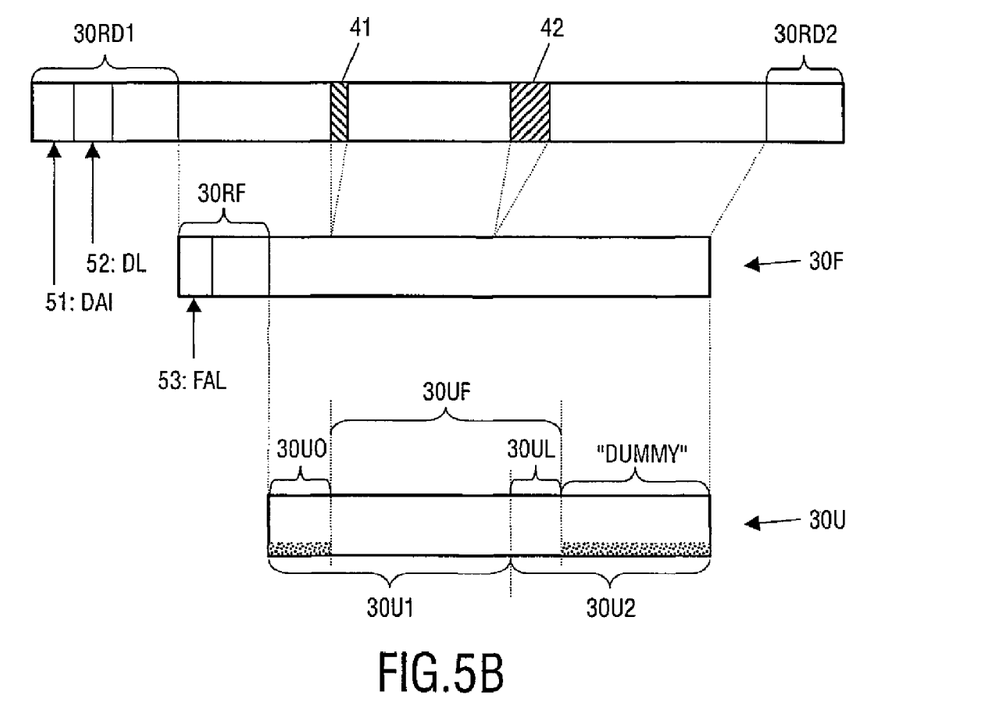

This preferred aspect of the present invention will now be discussed with reference to the FIGS. 5A and 5B. Similar to FIG. 4A, FIG. 5A illustrates the logical storage space 30 of an optical disc 2. Again, assume a maiden disc being formatted by the file system 20. In this second embodiment, the file system 20 is adapted to define a system file with a predetermined name, for instance "DUMMY", and to specify this system file "DUMMY" in the file allocation list 53 as covering all logical addresses in the second user storage area 30U2. This file allocation list 53 is stored on the disc. The file "DUMMY" is preferably defined as a hidden file.

As explained with reference to FIGS. 4A and 4B with respect to the first embodiment, any file system attempting a write operation on the disc 2 will take into account the information in the file allocation list FAL when selecting logical addresses for storing information. Since file systems are not allowed to store information in those locations where a file is already stored, a file system cannot write any information to the second storage layer 32, because the information in the file allocation list 53 tells such a file system that the second storage layer 32 is already occupied by a file, i.e. the hidden system file "DUMMY". Thus, this solution is also respected by conventional disc drives and by conventional file systems.

Similarly as above, it is possible to first write the entire first layer 31 and only then liberate the second layer 32. However, similarly as explained before, a file system 20 according to the present invention is preferably adapted to modify the information in the file allocation list 53 after each write operation, such as to liberate a portion 30UL of the second user storage area 30U2 if the amount of physical area already written in the first storage layer 31 is sufficiently large as explained before with reference to FIG. 4C.

In the above-described embodiments, the write history table WHT is used directly by the file system 20, either in the process of selecting storage space for writing or in the process of liberating a portion of the second storage layer. In both cases, since the write history table WHT relates to physical disc addresses, the file system 20 should have some information on the correspondence between physical disc addresses and logical disc addresses, for instance by having access to the disc address information DAI in said first portion 51 of the reserved storage space 30RD1, or by having information on the standard according to which the disc has been formatted.

In a further preferred embodiment, the file system 20 uses the write history table WHT indirectly. In this further preferred embodiment, the disc drive system 10 defines, on the basis of the write history table WHT, a write allowability table WAT which specifies which addresses of the second storage layer are free to be written; this write allowability table WAT is communicated to the file system 20. For instance, in respect of each logical disc address, the write allowability table WAT may have a bit having a first value ("0") if writing is not allowed and a second value ("1") if writing is allowed.

In this case, when ordered to write a file to the disc, the file system may be designed to only select logical disc addresses on the basis of the information in the write allowability table WAT. However, in order to ensure that the inhibition of the second storage layer is respected by conventional disc drives and by conventional file systems, the file system is preferably designed to define a system file with a predetermined name ("DUMMY"), covering all addresses of the second storage layer. Then, when writing a file, the file system can select storage space on the basis of the file allocation list FAL as usual. The disc drive system 10 is designed to update the write history table WHT, to update the write allowability table WAT on the basis of the updated write history table WHT, and to communicate the updated write allowability table WAT to the file system 20. The file system is designed to update the file allocation list FAL in order to liberate a storage portion 30UL from said system file, and to make its calculations in this respect on the basis of the updated write allowability table WAT.

An advantage of utilizing the defect list DL or writing a special system file DUMMY is that a dual layer disc which has been prepared in accordance with these embodiments will also be respected by any conventional or existing file system, because such a conventional file system must automatically take into account information from the defect list or the file allocation list. A conventional file system will not necessarily check a write history table WHT or a write allowability table WAT.

An advantage of utilizing the defect list DL over utilizing a special system file DUMMY is that it is not necessary to define an additional system file with a predetermined name.

It should be clear to a person skilled in the art that the present invention is not limited to the exemplary embodiments discussed above, but that various variations and modifications are possible within the protective scope of the invention as defined in the appended claims.

The present invention has been explained for the case of a dual layer disc, i.e. a disc having two different storage layers. The same principles of the present invention apply, however, also in the case of a disc having three or more layers.

Furthermore, as an alternative, it is also possible to implement a drive system with file system capabilities, so that the drive system itself can perform all inventive actions which are attributed to the file system in the above description. As an advantage, in that case it will not be necessary for the disc drive to communicate disc information to an outside file system, and actions for updating the information on the disc (defect list, file allocation list, write history table) in order to liberate portions of the second storage layer will not depend on the file system being implemented in accordance with the present invention.

Furthermore, it is to be noted that the functionality described above may be implemented in hardware or in software, as desired.

The invention claimed is:

1. A method of writing an optical disc having a multi-layered storage space comprising at least a first storage layer and a second storage layer below the first storage layer, the method comprising acts of preventing a write operation to a portion of said second storage layer located below a maiden portion of said first storage layer wherein the write operation to said portion of said second storage layer is prevented by defining said portion of said second storage layer as being defective or occupied, wherein a distinction is made between truly defective storage blocks and storage blocks which are merely temporarily defined as being virtually defective.

2. The method of claim 1, wherein said portion of said second storage layer is defined as being occupied by an act of defining a system file with a predetermined name to cover said portion of said second storage layer.

3. A method of formatting an optical disc having a multi-layered storage space comprising at least a first storage layer and a second storage layer below the first storage layer, the method comprising acts of:
    defining logical disc addresses for logical blocks of the storage space;
    defining a reserved storage space in the storage space;
    defining a defect list and storing the defect list in a predetermined portion of the reserved storage space, wherein a distinction is made between truly defective storage blocks and storage blocks which are merely temporarily defined as being virtually defective; and
    incorporating into the defect list addresses of all blocks which are physically located in the second storage layer.

4. The formatting method of claim 3, further comprising acts of:
    storing the defect type list in a predetermined portion of the storage space; and
    writing into the defect type list, in respect of the blocks which are physically located in the second storage layer, a virtually defective code indicating that these blocks are only virtually defective.

5. The formatting method of claim 3, further comprising an act of:
    writing disc address information regarding the relation between physical disc addresses and logical disc addresses into a predetermined portion of the reserved storage space.

6. A multi-layered optical disc having a multi-layered storage space comprising at least a first storage layer and a second storage layer below the first storage layer, the disc comprising:
    a defect list in a predetermined portion of a reserved storage space, the physical disc addresses of all blocks which are physically located in the second storage layer and which are located below a maiden portion of said first storage layer all being incorporated in said defect list, wherein a distinction is made between truly defective storage blocks and storage blocks which are merely temporarily defined as being virtually defective.

7. The multi-layered optical disc of claim 6, wherein the defect type list is contained in a predetermined portion of the storage space, wherein, in respect of those blocks which are physically located in the second storage layer and which are located below a maiden portion of said first storage layer, the defect type list contains a virtually defective code indicating that these blocks are only virtually defective.

8. The multi-layered optical disc of claim 6, further comprising disc address information regarding the relation between physical disc addresses and logical disc addresses in a predetermined portion of the reserved storage space.

9. A disc drive system, for controlling a rotating means and a light beam generating means of an optical disc drive, suitable for writing a multi-layered optical disc having a multi-layered storage space comprising at least a first storage layer and a second storage layer below the first storage layer, the disc drive system being adapted to perform formatting acts comprising:
    defining logical disc addresses for logical blocks of the storage space;
    defining a reserved storage space in the storage space;
    defining a defect list and storing the defect list in a predetermined portion of the reserved storage space, or defining a file allocation list in a predetermined portion of said reserved storage space wherein a distinction is made between truly defective storage blocks and storage blocks which are merely temporarily defined as being virtually defective; and
    incorporating into the defect list addresses of all blocks which are physically located in the second storage layer.

10. The disc drive system of claim 9, the disc drive system being adapted to read the defect list from said disc and to communicate the defect list to a file system.

11. The disc drive system of claim 9, the disk drive system being also adapted to define a file allocation list in a portion of the reserved storage space, the file allocation list containing at least one system file with a predetermined name, of which it is specified that it occupies all blocks which are physically located in the second storage layer and are located below a maiden portion of said first storage layer and to read the file allocation list from said disc and to communicate the file allocation list to a file system.

12. The disc drive system of claim 9, the system being adapted to check, after having written a maiden portion of said first storage layer, whether said first storage layer has been written completely, to maintain the defect list if said check reveals that said first storage layer has not yet been written completely and, alternatively, if said check reveals that said first storage layer has been written completely, to remove from said defect list all logical addresses of blocks which are physically located in said second storage layer.

13. The disc drive system of claim 12, the system being adapted to read the defect type list from said disc, and also adapted, when determining which physical disc addresses are to be removed from said defect list, to take into account the codes stored in the defect type list, such that blocks which are truly defective are maintained in the defect type list.

14. The disc drive system according to claim 9, the system being adapted, after having written a maiden portion of said first storage layer, to remove from said defect list physical disc addresses of blocks which are physically located in a portion of said second storage layer located below said written maiden portion of said first storage layer.

15. The disc drive system of claim 14, the system being adapted, when calculating which physical disc addresses are to be removed from said defect list, to take into account various properties of the disc and of a disc drive concerned.

* * * * *